(12) United States Patent
Takamatsu

(10) Patent No.: US 7,480,359 B2
(45) Date of Patent: Jan. 20, 2009

(54) SYMBOL CLOCK REGENERATING APPARATUS, SYMBOL CLOCK REGENERATING PROGRAM AND SYMBOL CLOCK REGENERATING METHOD

(75) Inventor: Kaoru Takamatsu, Sagamihara (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 703 days.

(21) Appl. No.: 11/213,711

(22) Filed: Aug. 30, 2005

(65) Prior Publication Data

US 2006/0045223 A1    Mar. 2, 2006

(30) Foreign Application Priority Data

Aug. 31, 2004    (JP)    ............... 2004-251350

(51) Int. Cl.
*H04L 7/00* (2006.01)
(52) U.S. Cl. ...................... 375/355; 375/371
(58) Field of Classification Search ................ 375/354, 375/355, 371, 373, 376
See application file for complete search history.

(56) References Cited

U.S. PATENT DOCUMENTS 5,524,126 A * 6/1996 Clewer et al. ............... 375/355
6,243,431 B1 * 6/2001 Han ........................... 375/355
6,580,765 B1 * 6/2003 Kim et al. ................... 375/327

* cited by examiner

*Primary Examiner*—David B Lugo
(74) *Attorney, Agent, or Firm*—Eric J. Robinson; Robinson Intellectual Property Law Office, P.C.

(57) ABSTRACT

To provide a technique for regenerating a symbol clock based on a digital modulation signal in which the symbol timing is accurately detected without need of using a synchronization word.

A symbol clock regenerating apparatus comprises symbol value acquisition means 1, 2 for acquiring a symbol value at a sampling timing with a sampling clock having a frequency m times (m is an integer of 3 or greater) that of a symbol clock to be regenerated, based on a digital modulation signal, arithmetic operation means 4 for calculating an arithmetic operation value indicating whether or not each symbol value sequentially acquired is the same as the preceding symbol value, buffer means 4 for sequentially storing each arithmetic operation value sequentially calculated in a buffer of n rows (n is an integer of one or greater) and m columns, and timing detection means 7 for detecting the symbol timing based on the sampling timing corresponding to each column of the buffer and the arithmetic operation values accumulated in the buffer.

14 Claims, 7 Drawing Sheets

FIG. 4

| | m SAMPLES/SYMBOL | | | | | |
|---|---|---|---|---|---|---|
| | 0 | 1 | 2 | 3 | 4 | BUFFER ROW NUMBER |
| | 0 | 1 | 0 | 1 | 1 | FIRST TIME |
| | 1 | 0 | 0 | 0 | 0 | SECOND TIME |
| | 1 | 0 | 0 | 1 | 0 | THIRD TIME |
| | 1 | 0 | 0 | 1 | 1 | FOURTH TIME |
| | ⋮ | ⋮ | ⋮ | ⋮ | ⋮ | |
| +) | 1 | 0 | 0 | 0 | 1 | n-TH TIME |
| | 11 | 1 | 0 | 3 | 0 | TOTAL IN TIMES |

↑ SYMBOL POINT (at column 2)

SYMBOL CLOCK REGENERATING APPARATUS, SYMBOL CLOCK REGENERATING PROGRAM AND SYMBOL CLOCK REGENERATING METHOD

BACKGROUND OF THE INVENTION

1. Field of the Invention

The present invention relates to a symbol clock regenerating apparatus, program and method for regenerating a symbol clock by detecting a symbol timing for a digital modulation signal.

2. Related Background Art

Generally, in a receiver for receiving the digital modulation signal, when a process of regenerating a symbol clock from a baseband signal obtained by detecting a modulation signal and regenerating a digital signal based on the symbol clock is performed, the symbol timing is deviated due to influence of a deviation in the reference oscillation frequency between transmitter and receiver or fading. If this deviation is greater, the bit error rate is worse, disabling the regeneration of data. Thus, conventionally, the symbol timing is captured, and the symbol clock is corrected to follow the symbol timing synchronously.

FIG. 7 is a block diagram showing the configuration of a clock regenerating apparatus in the conventional example in which such synchronous follow-up is enabled. In this apparatus, the symbol timing is acquired based on a synchronization word included in the detection signal, and a voltage-controlled oscillator circuit (hereinafter referred to as a "VCO") 91 is controlled to be synchronous with it to generate a symbol clock. At this time, the VCO 91 is controlled, based on an instantaneous value and a reference value obtained by the symbol clock, to correct the symbol clock. The detection signal is the instantaneous value of amplitude converted from a FSK (frequency-shift keying) modulation signal representing a four-value symbol.

In the same figure, reference numeral 92 designates a four-value determination part for generating the four-value signal based on the detection signal, 93 designates a clock delay part for delaying the symbol clock by a half period to output a delay clock, 94 designates a delay part for storing the value of detection signal at the timing when the delay clock rises, and outputting it, 95 designates a delay part for storing the output of the delay part 94 at the timing when the symbol clock rises, and outputting it, 96 designates a delay part for storing the four-value signal outputted by the four-value determination part 92 at the timing when the symbol clock rises, and outputting the symbol data, and 97 designates a delay part for storing the output of the delay part 96 at the timing when the symbol clock rises, and outputting it.

Also, reference numeral 98 designates an adder for adding the output of the delay part 97 and the symbol data, 99 designates an attenuation part for converting the output value of the adder 98 into its half value, 100 designates an adder for adding the outputs of the delay part 95 and the attenuation part 99, 101 designates an adder for adding the output of the attenuation part 99 and the symbol data, 102 designates an adder for adding the output of the delay part 97 and the symbol data, 103 designates a multiplier for multiplying the outputs of the adder 100 and the adder 101, 104 designates a gate part for passing the output of the multiplier 103 when the output value of the adder 102 is not zero and shutting off the output when it is zero, and 105 designates a low pass filter for controlling the VCO 91 based on the output of the gate part 104.

The low pass filter 105 counts up at a predetermined period while the output of the gate part 104 is positive, or counts down at the period while it is negative, supposing that the initial value is M. Thereby, if the count value reaches 2M, the VCO 91 is instructed to advance the phase of symbol clock by a prescribed value to reset the count value. Conversely, if the count value reaches zero, the VCO 91 is instructed to delay the phase of symbol clock by the prescribed value to reset the count value.

In this configuration, the VCO 91 is driven at the symbol timing acquired based on the synchronization word included in the detection signal to output the symbol clock. Meanwhile, the phase of symbol clock is corrected in the following way.

An intermediate value between the symbol data outputted by the delay part 96 and the preceding symbol data outputted by the delay part 97 is acquired by the adder 98 and the attenuation part 99, and defined as an expected value. On the other hand, a sample value of the detection signal corresponding to the intermediate value is acquired by the clock delay part 93, and the delay parts 94 and 95, and defined as a measured value. When the symbol clock has no deviation, a difference between the expected value and the measured value obtained by the adder 100 is ideally zero. When the symbol clock has a deviation, this difference is not zero, and the measured value is deviated to the plus or minus from the expected value.

Thus, the low pass filter 105 is controlled by the adders 101, 102, the multiplier 103 and the gate part 104 to count down when the phase of symbol clock advances, or count up when it delays. Thereby, the symbol clock is corrected so that if the count value reaches 2M, the phase is advanced, or if the count value reaches zero, the phase is delayed.

[Patent document 1] Japanese Patent Application Laid-Open No. 2003-333113

SUMMARY OF THE INVENTION

However, with the prior art, since the symbol timing is detected using a frame synchronization word, there is a problem that the presence or absence of a deviation in the symbol clock can not be determined until the synchronization word is detected.

Also, if the accurate clock timing is not acquired in a detection process of the synchronization word, the correct symbol timing can not be obtained, and therefore the symbol clock can not be corrected even if a regeneration process of the symbol clock is performed.

In the light of the above-mentioned problems associated with the prior art, it is an object of the invention to provide a technique for regenerating the accurate symbol clock based on the digital modulation signal without needing to use the synchronization word.

In order to accomplish the above object, according to the present invention, a symbol clock regenerating apparatus comprises symbol value acquisition means for acquiring a symbol value at a sampling timing with a sampling clock having a frequency m times (m is an integer of 3 or greater) that of a symbol clock to be regenerated, based on a digital modulation signal, arithmetic operation means for obtaining an arithmetic operation value indicating whether or not each symbol value sequentially acquired is the same as the preceding symbol value, buffer means for sequentially storing each arithmetic operation value sequentially obtained in a buffer of n rows (n is an integer of one or greater) and m columns, and timing detection means for detecting the symbol timing based on the sampling timing corresponding to each column of the buffer and the arithmetic operation values accumulated in the buffer.

Herein, the symbol clock regenerating apparatus is employed for a digital broadcasting receiver, for example. The digital modulation signal is the signal modulated by the four-value FSK modulation, for example. The symbol value at the sampling timing with the sampling clock having the frequency m times that of the symbol clock means not only the proper symbol value at the symbol timing, but also the value at the symbol clock timing other than the symbol timing, which is obtained in the same way. The symbol value acquisition means is constituted of means for detecting the digital modulation signal by the four-value FSK modulation, and means for converting the detection signal into the four-value signal. The arithmetic operation means corresponds to a circuit for calculating the exclusive OR.

In this constitution, the symbol value acquired by the symbol value acquisition means is the value at the sampling timing in which the interval between each symbol timing is further divided by m. Therefore, when the opening of eye in the eye pattern based on the digital modulation signal is fully opened, the arithmetic operation value indicating whether or not each symbol value sequentially acquired is the same as the preceding symbol value, whereby the arithmetic operation values corresponding to the opening portion of eye for every m are obtained. And there is possibility that each symbol value is the same as the preceding and succeeding symbol values, if it is the true symbol value at the symbol timing. Accordingly, in the buffer of n rows and m columns in which the arithmetic operation values are sequentially stored, the buffer column in which there are a number of arithmetic operation values indicating that the symbol value is the same as the preceding symbol value substantially corresponds to the opening portion of eye. Accordingly, the sampling timing or its neighborhood may be extracted as the symbol timing to regenerate the symbol clock based on it.

The second invention provides the symbol clock regenerating apparatus according to the first invention, wherein the arithmetic operation value is an exclusive OR of the symbol value sequentially acquired and the preceding symbol value.

The third invention provides the symbol clock regenerating apparatus according to the first or second invention, wherein the timing detection means comprises integration means for integrating the arithmetic operation values stored in the buffer for each column, and detects the symbol timing based on an integral value of each column.

The fourth invention provides the symbol clock regenerating apparatus according to the third invention, wherein the timing detection means detects the new symbol timing as the sampling timing corresponding to a buffer column of which the integral value is minimum and less than or equal to a predetermined threshold, when the detection of the sampling timing is the first time.

The fifth invention provides the symbol clock regenerating apparatus according to the third invention, wherein the timing detection means detects the new symbol timing as the sampling timing corresponding to a buffer column of which the integral value is minimum and less than or equal to a predetermined threshold, among the buffer column corresponding to the symbol timing decided by the detection at the previous time and the buffer columns on both sides thereof, when the detection of the sampling timing is not the first time.

The sixth invention provides the symbol clock regenerating apparatus according to the fifth invention, wherein the timing detection means detects the new symbol timing as the preceding symbol timing advanced or delayed by one sampling clock, if a buffer column of which the integral value is minimum and less than or equal to a predetermined threshold exists among the buffer columns other than the buffer column corresponding to the symbol timing decided by the detection at the previous time and the buffer columns on both sides thereof, when the buffer column of which the integral value is minimum and less than or equal to a predetermined threshold does not exist.

The seventh invention provides the symbol clock regenerating apparatus according to any one of the fourth to sixth inventions, further comprising means for adjusting the buffer column corresponding to the symbol timing to be at the center or at a predetermined position in the row direction in accordance with the detection of the symbol timing.

The eighth invention provides the symbol clock regenerating apparatus according to any one of the third to seventh inventions, wherein the timing detection means does not detect the symbol timing when the buffer column of which the integral value is less than or equal to a predetermined threshold does not exist.

The ninth invention provides a symbol clock regenerating program for causing a computer to operate as each means making up the symbol clock regenerating apparatus according to any one of the first to eighth inventions.

The tenth invention provides a symbol clock regenerating apparatus comprising a symbol value conversion step of converting a digital modulation signal into a symbol value at a sampling timing with a sampling clock having a frequency m times (m is an integer of 3 or greater) that of a symbol clock to be regenerated, an arithmetic operation step of obtaining an arithmetic operation value indicating whether or not the symbol value sequentially acquired is the same as the preceding symbol value, a buffer step of sequentially storing the arithmetic operation value sequentially obtained in a buffer of n rows (n is an integer of one or greater) and m columns, and a timing detection step of detecting the symbol timing based on the sampling timing corresponding to each column of the buffer and the arithmetic operation values accumulated in the buffer.

With the invention, when the opening of eye in the eye pattern based on the digital modulation signal is fully opened, the symbol timing can be extracted without depending on the frame synchronization word. Since the possibility of this extraction means that the digital modulation signal is actually inputted, it is possible to determine whether or not the digital modulation signal is actually inputted without depending on the frame synchronization word. Accordingly, in the case where the invention is applied to the receiver, it is possible to determine the presence or absence of the digital modulation signal before detecting the synchronization word, when multiple channels are scanned.

Also, since the symbol timing is detected based on the arithmetic operation value indicating whether or not the symbol value is the same as the symbol value at the preceding sample timing, the symbol timing can be accurately detected, even when there is a deviation in the frequency due to an offset contained in the detection signal based on the digital modulation signal and the symbol value is shifted as a whole.

Also, since the symbol timing is detected based on the data in which m symbol values for one symbol are accumulated n times, the symbol clock can be regenerated at high accuracy by setting m and n to sufficiently large values.

BRIEF DESCRIPTION OF THE DRAWINGS

FIG. 4 is a diagram exemplifying the substance of a buffer matrix employed by an integrator in the apparatus of FIG. 1;

DESCRIPTION OF THE PREFERRED EMBODIMENTS

Figure 1:
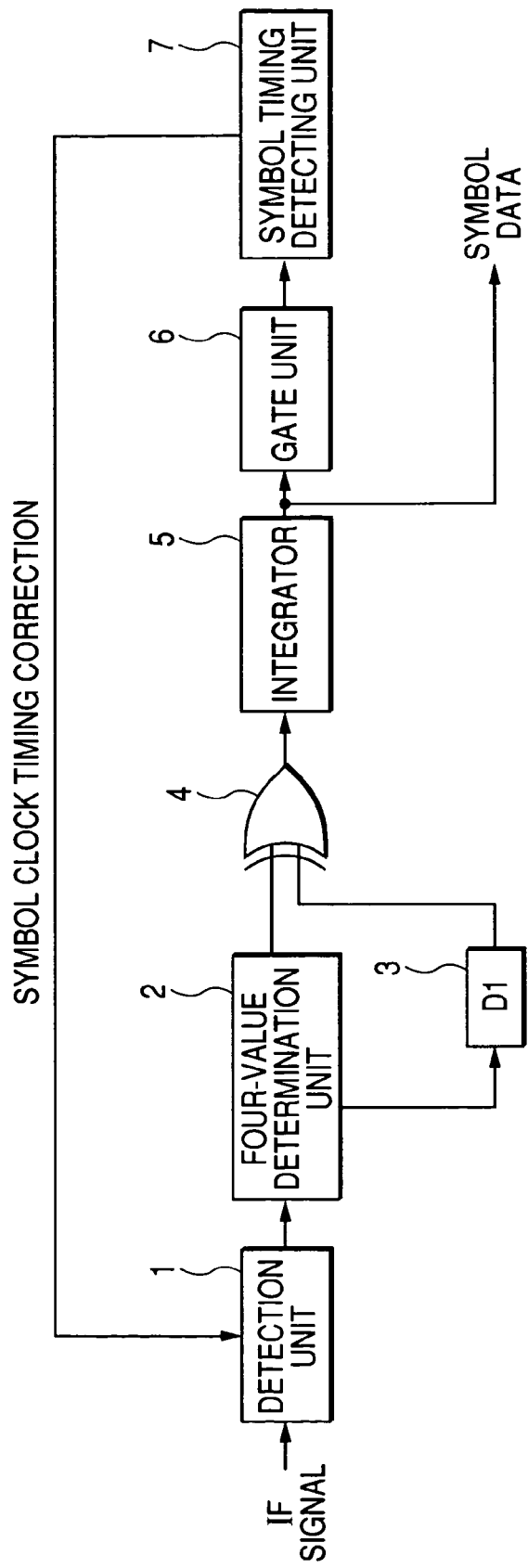
FIG. 1 is a block diagram showing the configuration of a symbol clock regenerating apparatus according to one embodiment of the present invention.

FIG. 1 is a block diagram showing the configuration of a symbol clock regenerating apparatus according to one embodiment of the present invention. In the same figure, reference numeral 1 designates a detection part for converting a frequency deviation amount of an IF signal into the instantaneous value at each sampling timing based on the IF signal in which a received digital modulation signal is converted into intermediate frequency and outputting a detection signal. A received signal is a four-value FSK modulation signal for transmitting two bits per symbol. The number of samples is five samples per symbol, and the sampling is made at a clock frequency five times the symbol clock.

In FIG. 1, reference numeral 2 designates a four-value determination part for making the hard determination based on the detection signal and generating a four-value signal indicating any one of four values, 3 designates a delay circuit for holding the previous output of the four-value determination part to make the arithmetical operation between the current output and the previous output, 4 designates an XOR operation circuit for making the exclusive OR between the current output of the four-value determination part 2 and the previous output, 5 designates an integrator for calculating the integral value for every buffer column by accumulating the operation result of the XOR operation circuit 4 in a buffer matrix, 6 designates a gate part for outputting the integral value in the integrator 5 every time the buffer matrix becomes full, and 7 designates a symbol timing detecting part for detecting the symbol timing in the detection part 1 based on the integral value from the gate part 6. Each of the elements can be constructed by hardware using a logical circuit, but may be a program for causing a computer to perform each operation.

Figure 2:
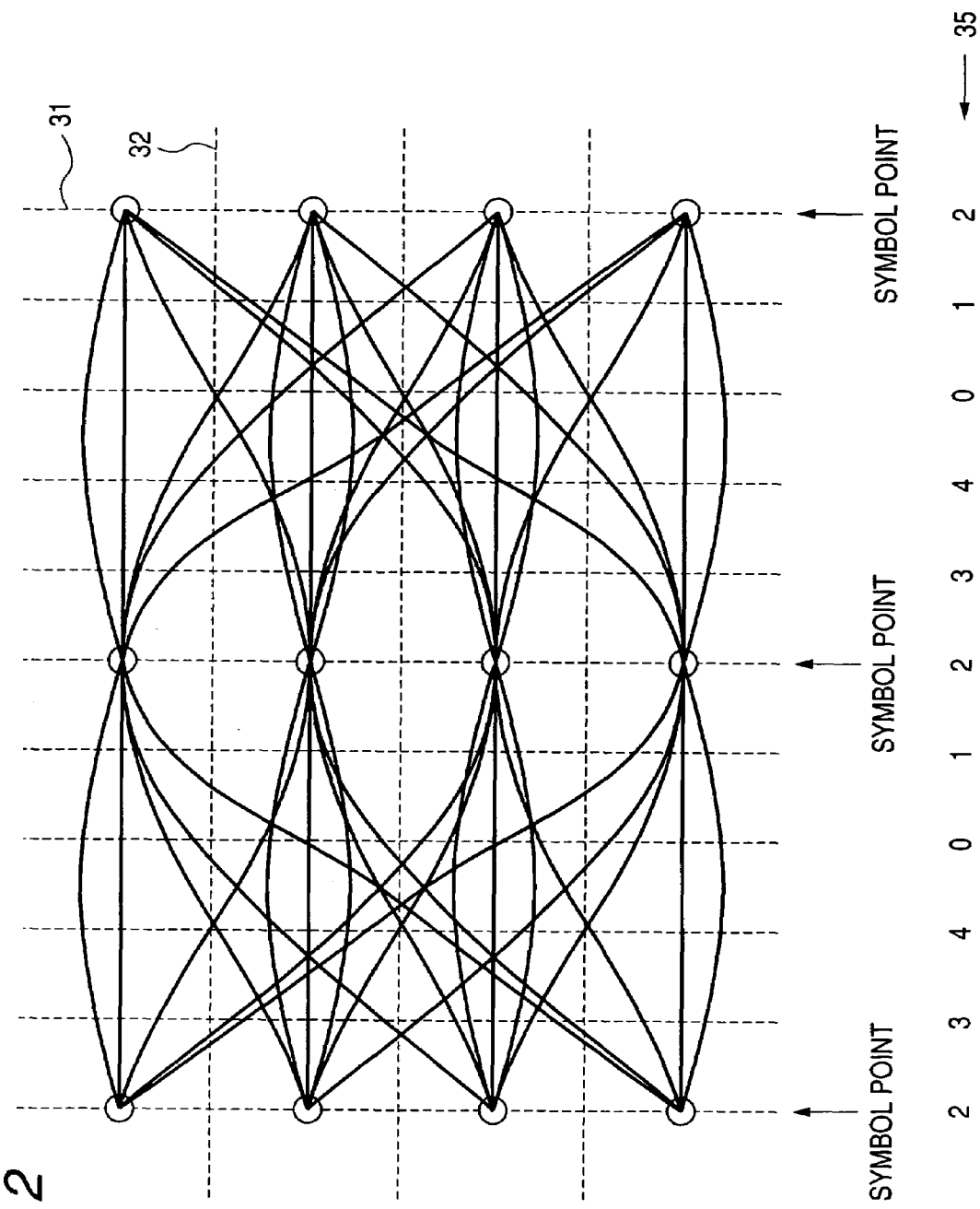
FIG. 2 is a diagram showing an eye pattern based on a digital modulation signal inputted into the apparatus of FIG. 1.
Figure 3:
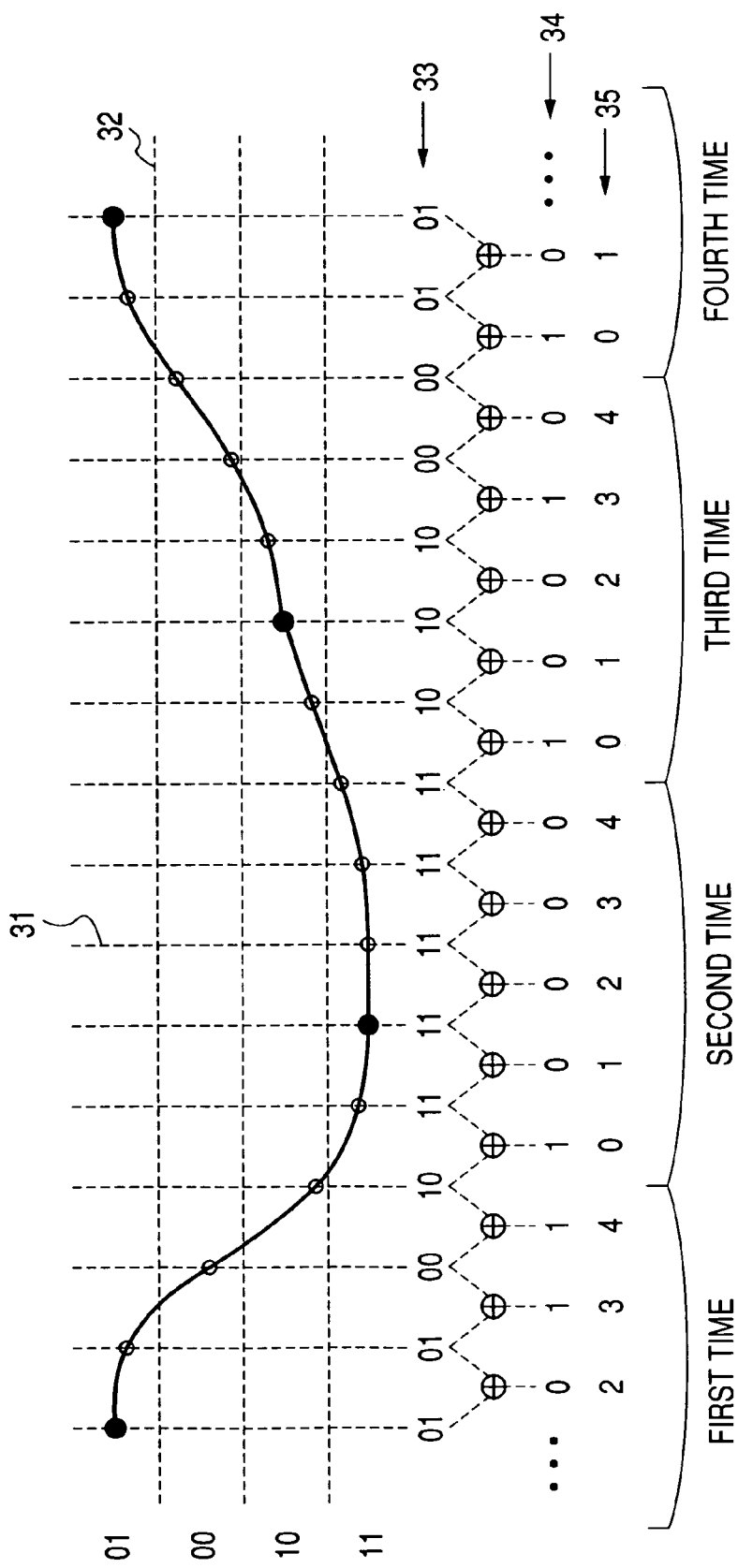
FIG. 3 is a diagram representing a detection signal based on a digital modulation signal inputted into the apparatus of FIG. 1 along the time axis.

FIG. 2 is a diagram showing an eye pattern based on the digital modulation signal. FIG. 3 is a diagram representing the detection signal based on the digital modulation signal along the time axis. In these figures, reference numeral 31 designates a broken line indicating the sampling timing in the detection part 1, and 32 designates a broken line indicating a threshold for determining which symbol value of four values each sampling value corresponds to. In FIG. 3, a black dot ● denotes an ideal symbol point. A small white dot ○ denotes a sampling value at other sampling timings.

In FIG. 3, reference numeral 33 designates a two-bit value indicating the four-value signal outputted by the four-value determination part 2. Each value is represented corresponding to the sampling timing. Reference numeral 34 designates an output value of the XOR operation circuit 4 based on this four-value signal. In FIGS. 2 and 3, reference numeral 35 designates the column number of buffer in which each output value is stored.

FIG. 4 is an example of the buffer matrix employed by the integrator 5. The buffer matrix has buffers in n rows×m columns, where m corresponds to the number of samples in one symbol section, and n corresponds to the number of symbol sections in the integrator 5 to store the operation results of the XOR operation circuit 4 in the buffer matrix. In this embodiment, m is 5 and each buffer column has the number of 0 to 4.

Each symbol contained in the digital modulation signal takes any of four values, in which this symbol value corresponds to a frequency deviation in the digital modulation signal. When the frequency deviation is 600[Hz], 1800[Hz], −600[Hz] and −1800[Hz], the symbol value is 00, 01, 10 and 11 in the bit string. In determining which value the sampled frequency deviation amount corresponds to, the thresholds 0[Hz], 1200[Hz] and −1200[Hz] are employed.

The four-value determination part 2 makes the hard determination for determining which range partitioned by the thresholds the sample value indicated by the detection signal belongs to, acquiring the symbol value corresponding to the sample value. The symbol value is 00 when the sample value is from 0[Hz] to 1200[Hz], 01 when it is 1200[Hz] or more, 10 when it is from −1200[Hz] to 0[Hz], and 11 when it is below −1200[Hz].

Figure 5:
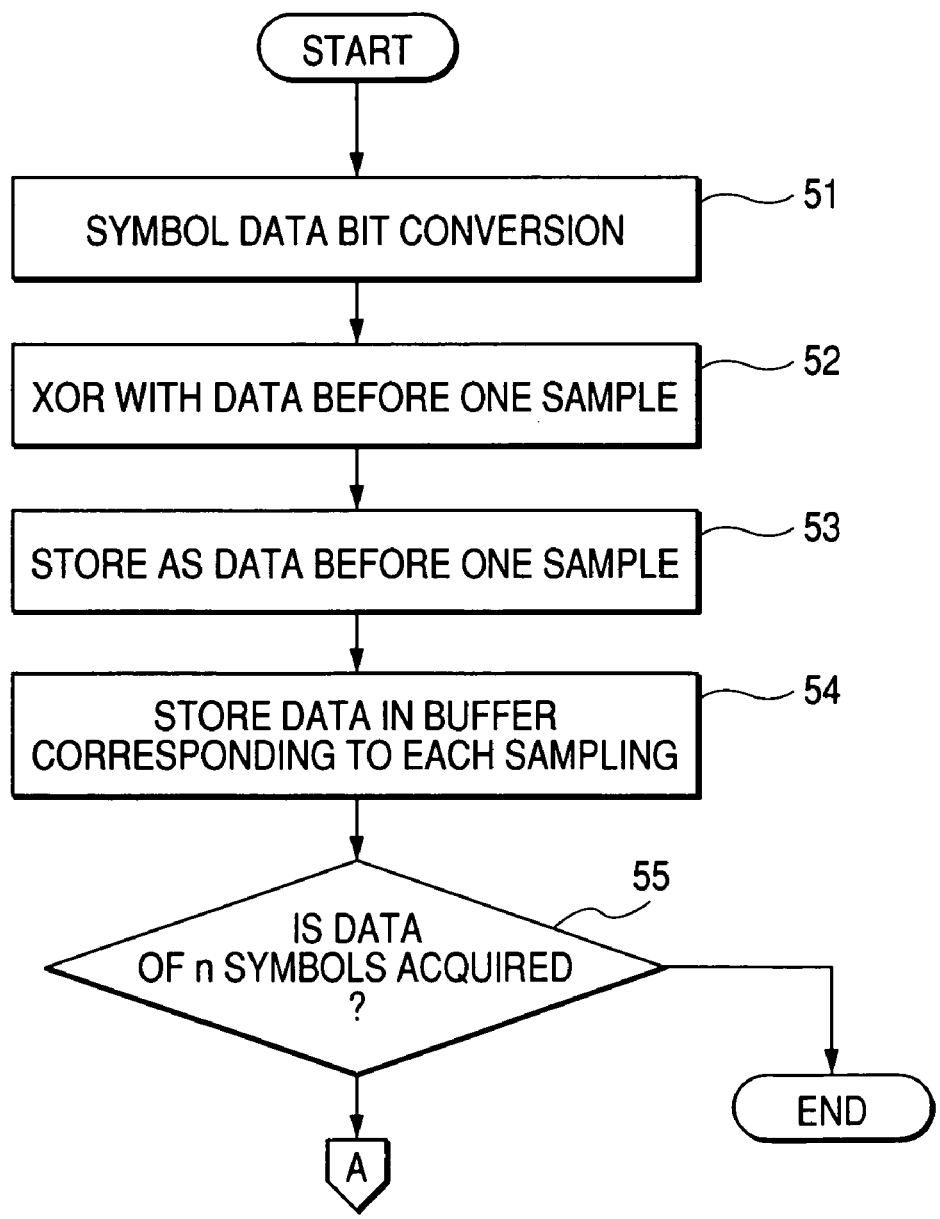
FIG. 5 is a flowchart showing the former half of a process in the apparatus of FIG. 1.
Figure 6:
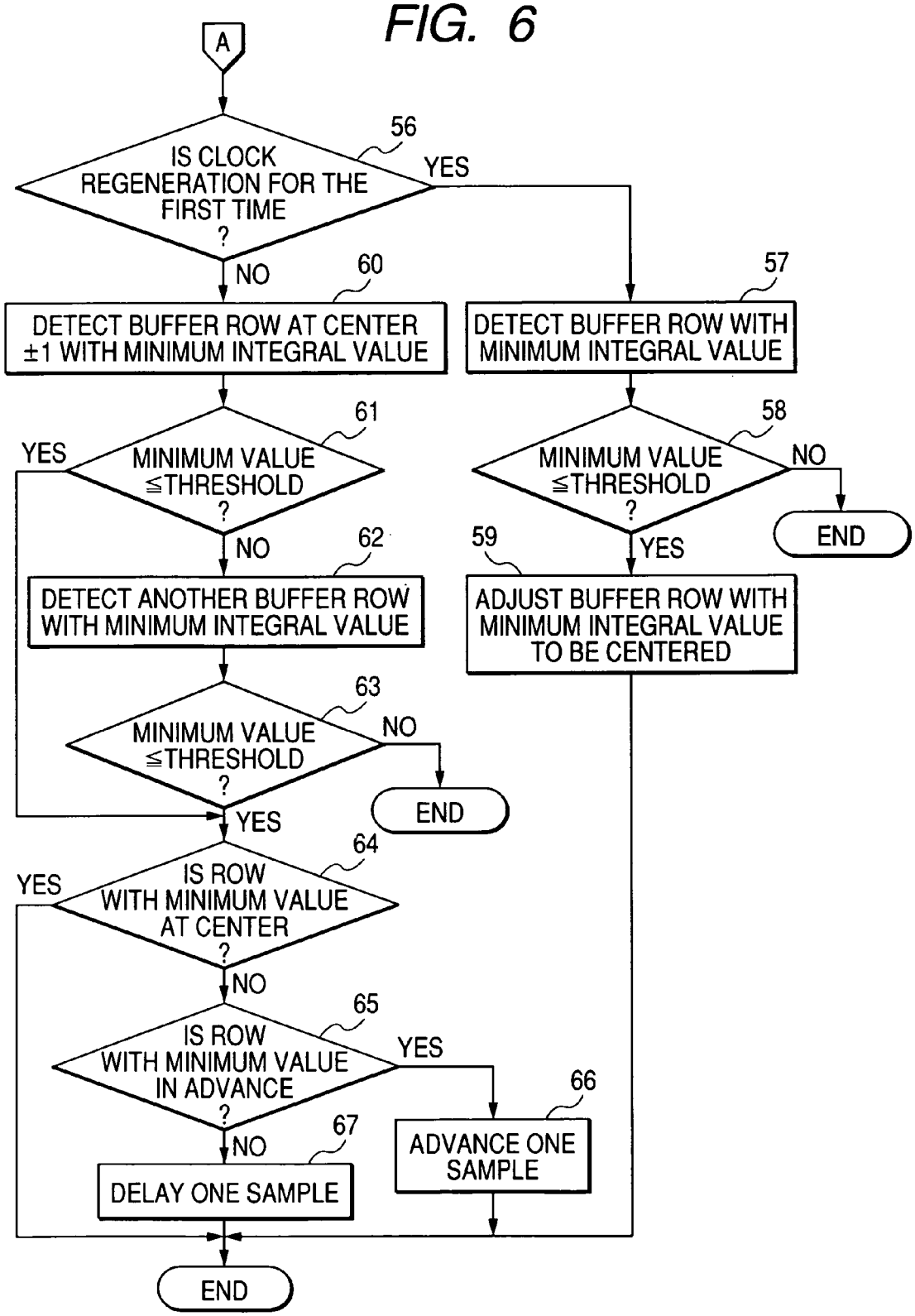
FIG. 6 is a flowchart showing the latter half of the process in the apparatus of FIG. 1.
Figure 7:
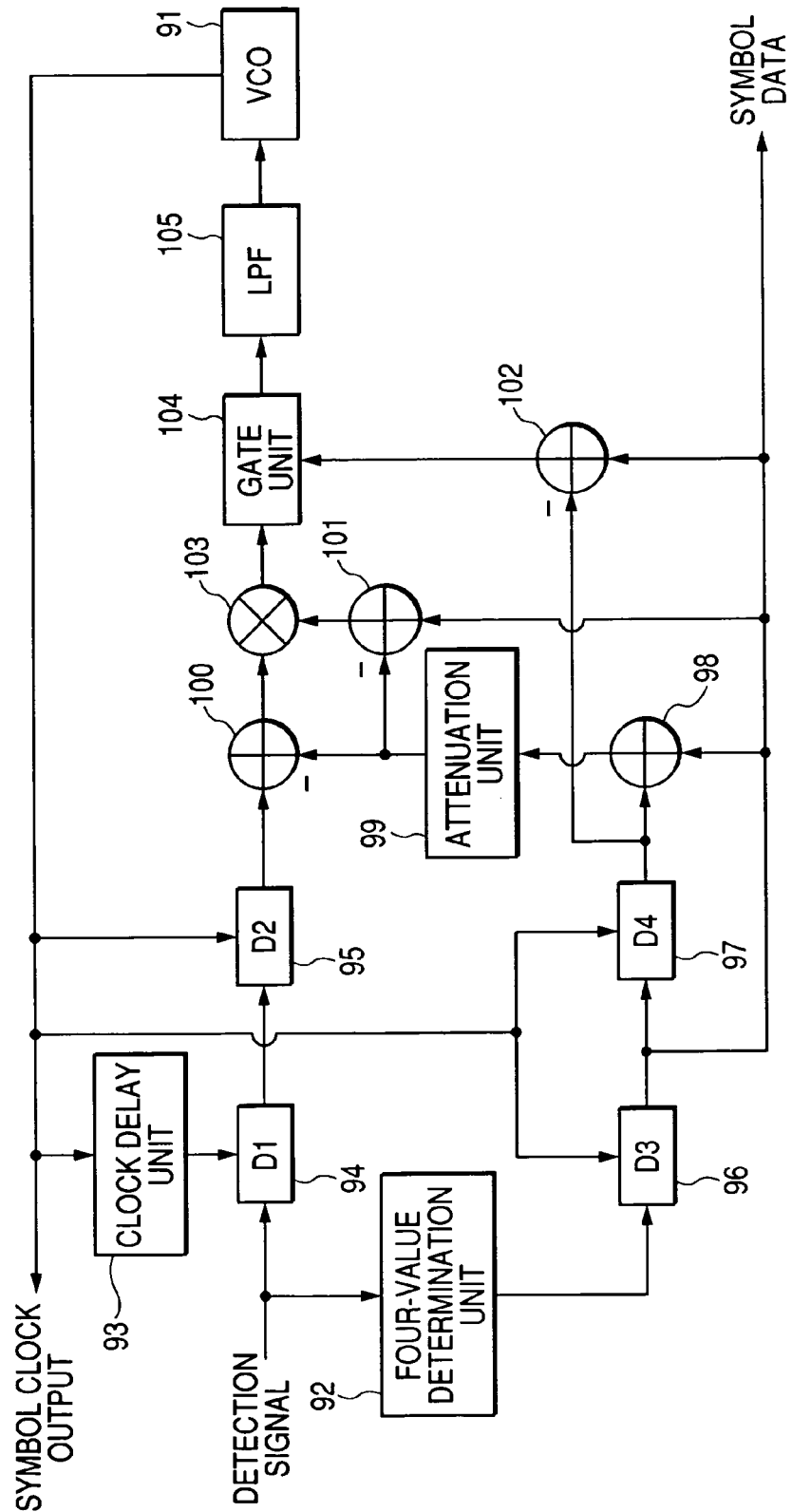
FIG. 7 is a block diagram showing the configuration of a clock regenerating apparatus in the conventional example.

FIGS. 5 and 6 are flowcharts showing a process in the apparatus of FIG. 1. This process is performed at every sampling timing 31 in FIG. 3.

First of all, at step 51, the symbol value corresponding to the detection signal at the current sampling timing from the detection part 1 is obtained by the four value determination part 2. In FIG. 3, each symbol value 33 illustrates the value obtained through this process.

At step 52, the exclusive OR between the symbol value at the preceding sampling timing held by the delay circuit 3 and the symbol value at the current sampling timing outputted by the four value determination part 2 is taken by the XOR operation circuit 4. The operation result is 1 if both symbol values are different, or 0 if they are equal.

That is, if the line connecting the sample values at both sampling timings crosses any threshold, and those sample values belong to different threshold sections, the operation result is 1, or if the line connecting both sample values does not cross any threshold, and bath sample values belong to the same threshold section, the operation result is 0, as shown in FIG. 3. In FIG. 3, the output value 34 illustrates the operation result obtained through this process.

At steps 53 and 54, the operation result at step 52 is stored in the corresponding buffer in the buffer matrix, as the data corresponding to the preceding sampling timing. As shown in FIG. 4, the data at each sampling timing in the N-th ($1 \leq N \leq n$) symbol section since the start of accumulation in the buffer matrix is stored in the buffer at the N-th row, and the data at the M-th ($1 \leq M \leq m$) sampling timing in each symbol section is stored in the buffer at the M-th column in that row, namely, the buffer having the buffer column number of M-1.

At step 55, it is determined whether or not the operation results for n symbol sections are acquired. If not, the process is ended. In this case, a processing of steps 51 to 54 is performed at the next sampling timing. As shown in FIGS. 3 and 4, the data of one symbol section is obtained by repeating the processing of steps 51 to 54 m times (five times), and the data of n symbol sections is obtained by repeating this operation n times. If it is determined that the results of n symbol sections are acquired at step 55, the procedure goes to step 56.

At step 56, it is determined whether or not the regeneration of symbol clock is the first time. When this step is performed for the first time for the modulation signal being currently received, the regeneration of symbol clock is the first time. The regeneration at the sampling timing immediately after the procedure is ended according to the determination result at step 58 is also the first time. If it is determined that the regeneration of symbol clock is the first time, the procedure goes to step 57, or if not, the procedure goes to step 60.

At step 57, the values in each column of the buffer matrix are integrated for n rows by the integrator 5 and the symbol timing detecting part 7, whereby the minimum integral value is extracted.

At step 58, it is determined whether or not the extracted minimum integral value is less than or equal to a predetermined threshold. If the extracted minimum integral value is greater than the predetermined threshold, the procedure is ended. In this case, since the opening of eye in the eye pattern based on the digital modulation signal is not fully opened, the symbol timing is not detected, and the symbol clock is not regenerated. On the other hand, if the minimum integral value is less than or equal to the threshold, the procedure goes to step 59.

At step 59, the buffer column with the minimum integral value is adjusted to be the central buffer column in the buffer matrix when the data is accumulated at the next time, namely, the buffer column number of 2. This adjustment can be made by ending the procedure after an interval of the next one or more sampling timings. Thereafter, when the new data starts to be accumulated in the buffer matrix at the next sampling timing, the data is accumulated in the buffer matrix, with the buffer column with the minimum integral value being the central buffer column. In the examples of FIGS. 3 and 4, the buffer column with the minimum integral value is located in the third column just at the center, and the adjustment is unnecessary.

In the eye pattern of the modulation signal as shown in FIG. 2, when the eye is opened, the threshold is not crossed for the adjacent sample values corresponding to the opening portion of eye, whereby it is determined that the integral value in the corresponding buffer column is minimum, ideally 0, and the sampling timing corresponding to the buffer column is at the symbol point, namely, Nyquist point.

Accordingly, at step 59 and on, the symbol data is acquired, employing the sampling timing corresponding to the data accumulated in the central buffer column as the symbol timing, and the clock representing it as the symbol clock. That is, thereby, the symbol clock can be regenerated. And the symbol value corresponding to the central buffer column, for example, the symbol value 33 for the sample value of black dot ● in the example of FIG. 3, can be outputted as the symbol data at the symbol timing.

On the other hand, when it is determined at step 56 that the regeneration of symbol clock is not the first time and the procedure goes to step 60, the proper symbol timing is detected by the symbol timing detecting part 7, and the symbol clock timing is corrected, as needed. That is, first of all, at step 60, the buffer column of which the integral value of n rows obtained by the integrator 5 is minimum is extracted from among the central buffer column and the buffer columns on both sides thereof, namely, the buffer columns having the buffer column numbers of 1, 2 and 3.

Next, at step 61, it is determined whether or not the extracted minimum integral value is less than or equal to a predetermined threshold. If the minimum integral value is less than or equal to the threshold, the procedure goes to step 64, or if not, the procedure goes to step 62.

At step 62, the buffer column of which the integral value of n rows obtained by the integrator 5 is minimum is extracted from among the other buffer columns, namely, the buffer columns having the buffer column numbers of 0 and 4.

At step 63, it is determined whether or not the extracted minimum integral value is less than or equal to the threshold. If the minimum integral value is greater than the threshold, the symbol clock is not corrected, because the symbol timing is not reliable even if the symbol timing is detected based on the integral value, whereby the procedure is ended. On the other hand, if the extracted minimum integral value is less than or equal to the threshold, the procedure goes to step 64.

At step 64, it is determined whether or not the extracted minimum integral value is the integral value in the central buffer column. If the minimum integral value is in the central buffer column, it is judged that the symbol clock is not deviated off the symbol timing, whereby the procedure is ended without correcting the symbol clock. If the minimum integral value is not in the central buffer column, the procedure goes to step 65.

At step 65, it is determined whether or not the buffer column number corresponding to the extracted minimum integral value is greater than the median or 2. If it is greater than the median, the symbol clock is advanced by one sample timing at step 66, whereby the procedure is ended. If it is smaller than the median, the symbol clock is delayed by one sample timing at step 67, whereby the procedure is ended.

This processing of advancing or delaying the clock is performed by ending the procedure after an interval of one sampling timing or four sampling timings. After this correction for the symbol clock, when the new data starts to be accumulated in the buffer matrix at the next sampling timing, the data can be accumulated in the buffer matrix so that the buffer column with the minimum integral value may be located at the center. Meanwhile, the symbol value 33 at the sampling timing corresponding to the central buffer column, or the sampling timing at which the black dot ● is located in the example of FIG. 3, can be outputted as the symbol data at the symbol timing.

In this embodiment, if the digital modulation signal is inputted, and the eye in the eye pattern based on the modulation signal is opened, the symbol timing is captured (steps 57, 58), and the symbol clock is regenerated (step 59). On the other hand, when a negative determination is made at step 58 and the procedure is immediately ended, it is meant that the symbol timing can not be captured and the digital modulation signal is not inputted. Therefore, the presence or absence of digital modulation signal can be determined without employing the frame synchronization word. Accordingly, in the receiver to which this symbol clock regenerating apparatus is applied, when the digital broadcasting of multiple channels is scanned, the presence or absence of digital modulation signal can be determined before detecting the synchronization word.

Also, since a deviation in the symbol timing is detected based on the integral value of the exclusive OR between the symbol value at each sample point and the symbol value at the preceding sample point (steps 60 to 65), when there is a frequency deviation, or when the detection signal contains an offset, the opening portion of eye in the eye pattern based on the digital modulation signal is detected (steps 60 to 65) to accurately capture the symbol timing, and the symbol clock is made to follow the symbol timing (steps 66, 67).

Also, since a deviation in the symbol clock from the symbol timing is detected by performing the statistical processing for the data of n symbol sections, based on a histogram of integrating the values of each buffer column, the symbol clock can be made to follow the symbol timing at high precision.

This invention is not limited to the above embodiment, but may be changed in various ways. For example, in the above explanation, the symbol clock is acquired with the sampling timing corresponding to the central buffer column as the symbol timing, and corrected by adjusting the integral value of the central buffer column to be minimum. That is, the central buffer column is based on. However, instead, a prescribed buffer column other than the central buffer column may be based on to acquire and correct the symbol clock in the same way.

Though the four-value FSK modulation signal is employed as the digital modulation signal in the above explanation, the invention is also applicable to the digital modulation signal in any other digital modulation system.

What is claimed is:

1. A symbol clock regenerating apparatus comprising:
    symbol value acquisition means for acquiring a symbol value at a sampling timing with a sampling clock having a frequency m times (m is an integer of 3 or greater) that of a symbol clock to be regenerated, based on a digital modulation signal;
    arithmetic operation means for obtaining an arithmetic operation value indicating whether or not each symbol value sequentially acquired is the same as the preceding symbol value;
    buffer means for sequentially storing each arithmetic operation value sequentially obtained in a buffer of n rows (n is an integer of one or greater) and m columns; and
    timing detection means for detecting the symbol timing based on said sampling timing corresponding to each column of said buffer and the arithmetic operation values accumulated in said buffer.

2. The symbol clock regenerating apparatus according to claim 1, wherein said arithmetic operation value is an exclusive OR of said symbol value sequentially acquired and the preceding symbol value.

3. The symbol clock regenerating apparatus according to claim 2, wherein said timing detection means comprises integration means for integrating the arithmetic operation values stored in said buffer for each column, and detects said symbol timing based on an integral value of each column.

4. The symbol clock regenerating apparatus according to claim 3, wherein said timing detection means detects the new symbol timing as said sampling timing corresponding to a buffer column of which said integral value is minimum and less than or equal to a predetermined threshold, when the detection of said sampling timing is the first time.

5. The symbol clock regenerating apparatus according to claim 3, wherein said timing detection means detects the new symbol timing as said sampling timing corresponding to a buffer column of which said integral value is minimum and less than or equal to a predetermined threshold, among the buffer column corresponding to the symbol timing decided by the detection at the previous time and the buffer columns on both sides thereof, when the detection of said sampling timing is not the first time.

6. The symbol clock regenerating apparatus according to claim 5, wherein said timing detection means detects the new symbol timing as the preceding symbol timing advanced or delayed by said one sampling clock, if a buffer column of which the integral value is minimum and less than or equal to a predetermined threshold exists among the buffer columns other than said buffer column corresponding to the symbol timing decided by the detection at the previous time and the buffer columns on both sides thereof, when the buffer column of which said integral value is minimum and less than or equal to a predetermined threshold does not exist.

7. The symbol clock regenerating apparatus according to claim 1, wherein said timing detection means comprises integration means for integrating the arithmetic operation values stored in said buffer for each column, and detects said symbol timing based on an integral value of each column.

8. The symbol clock regenerating apparatus according to claim 7, wherein said timing detection means detects the new symbol timing as said sampling timing corresponding to a buffer column of which said integral value is minimum and less than or equal to a predetermined threshold, when the detection of said sampling timing is the first time.

9. The symbol clock regenerating apparatus according to claim 8, further comprising means for adjusting said buffer column corresponding to the symbol timing to be at the center or at a predetermined position in the row direction in accordance with the detection of said symbol timing.

10. The symbol clock regenerating apparatus according to claim 7, wherein said timing detection means detects the new symbol timing as said sampling timing corresponding to a buffer column of which said integral value is minimum and less than or equal to a predetermined threshold, among the buffer column corresponding to the symbol timing decided by the detection at the previous time and the buffer columns on both sides thereof, when the detection of said sampling timing is not the first time.

11. The symbol clock regenerating apparatus according to claim 10, wherein said timing detection means detects the new symbol timing as the preceding symbol timing advanced or delayed by said one sampling clock, if a buffer column of which the integral value is minimum and less than or equal to a predetermined threshold exists among the buffer columns other than said buffer column corresponding to the symbol timing decided by the detection at the previous time and the buffer columns on both sides thereof, when the buffer column of which said integral value is minimum and less than or equal to a predetermined threshold does not exist.

12. The symbol clock regenerating apparatus according to claim 7, wherein said timing detection means does not detect the symbol timing when the buffer column of which said integral value is less than or equal to a predetermined threshold does not exist.

13. A symbol clock regenerating program for causing a computer to operate as each means making up the symbol clock regenerating apparatus according to claim 1.

14. A symbol clock regenerating method comprising:
    a symbol value conversion step of converting a digital modulation signal into a symbol value at a sampling timing with a sampling clock having a frequency m times (m is an integer of 3 or greater) that of a symbol clock to be regenerated;
    an arithmetic operation step of obtaining an arithmetic operation value indicating whether or not said symbol value sequentially acquired is the same as the preceding symbol value;
    a buffer step of sequentially storing said arithmetic operation value sequentially obtained in a buffer of n rows (n is an integer of one or greater) and m columns; and
    a timing detection step of detecting the symbol timing based on said sampling timing corresponding to each column of said buffer and the arithmetic operation values accumulated in said buffer.

* * * * *